United States Patent Office 2,937,099
Patented May 17, 1960

2,937,099
DENTAL PREPARATION

Austin H. Kutscher, Highland Park, N.J., assignor to Olin Mathieson Chemical Corporation, New York, N.Y., a corporation of Virginia No Drawing. Application April 28, 1958
Serial No. 731,086

6 Claims. (Cl. 106—35)

This invention relates to, and has for its object, the provision of new dental compositions; more particularly, this invention relates to improved dental compositions intended for use as a sedative cement in the treatment of diseased teeth.

For many years zinc oxide-eugenol cement has been utilized as a sedative dressing in the filling of teeth. Compositions containing varying percentages of the zinc oxide and eugenol have been employed as a covering for exposed pulps, as adhesives to hold medicinal agents in tooth cavities, and as surgical packs or protective dressings in certain periodontal procedures.

It has been noted that the zinc oxide-eugenol compositions when applied as a sedative cement in the filling of teeth or as a prime ingredient in periodontal packs will wear away or fracture out either partially or completely within a relatively short span of time.

It has now been found that by the addition of dicalcium phosphate to the zinc oxide-eugenol compositions, a dental composition of more lasting quality is obtained. The addition of the dicalcium phosphate enables the preparation of a composition with increased hardness or crushing strength which lasts longer, thereby enabling the retention of shape contour and protective properties of the dental filling. As a result of these improved qualities of the sedative cement, more effective protection for the tooth of the patient is obtained.

A further advantage of the compositions of this invention is the use thereof as a base for permanent fillings. Heretofore zinc oxide-eugenol compositions have been applied to supply only temporary protection having been subsequently removed or covered by a regular cement and thereafter the permanent filling. The compositions of this invention however may be utilized not only as a temporary filling but also as an improved base for the permanent filling making it unnecessary to remove or cover the composition originally placed in the tooth.

It, therefore, is an object of this invention to provide a dental composition essentially comprising zinc oxide, eugenol and dicalcium phosphate, the latter being present in at least about 1% of the weight of the zinc oxide and preferably in about 2-100% of the weight of zinc oxide.

It is a further object of this invention to provide a constituent for a dental cement which essentially comprises a mixture of zinc oxide and dicalcium phosphate, the components being preferably in the ratio stated hereinbefore.

Lubricating agents (e.g. magnesium stearate, zinc stearate, mineral oil, olive oil) in varying amounts may be utilized as desired.

The compositions of this invention are prepared by a process which essentially comprises incorporating dicalcium phosphate with zinc oxide. When the dentist is ready to apply the sedative cement, the zinc oxide-dicalcium phosphate is blended with sufficient eugenol to form a putty-like paste.

The following examples are illustrative but not limitative of the invention:

Example I

| | Grams |
|---|---|
| Zinc oxide | 100 |
| Dicalcium phosphate | 3.5 |
| Mineral oil | .025 |
| Magnesium stearate | .025 |

(a) The magnesium stearate is added, with thorough stirring, to the mineral oil. Sufficient dicalcium phosphate is added thereto to render the mixture powdery in consistency. The remaining dicalcium phosphate is then added with mixing, continued until the dicalcium phosphate is thoroughly blended with the magnesium stearate-mineral oil mixture.

(b) Zinc oxide is then added, with thorough mixing, in an amount equivalent to (a). Addition of the zinc oxide by geometric dilution (subsequently adding zinc oxide in amounts equal to the total mixture) is continued until all the zinc oxide has been utilized.

When the sedative cement is to be applied, (b) is blended with a sufficient quantity of eugenol to form a putty-like paste.

Example II

| | Grams |
|---|---|
| Zinc oxide | 100 |
| Dicalcium phosphate | 7 |
| Mineral oil | 0.05 |
| Magnesium stearate | 0.05 |

Following the procedure of Example I the above formulation may be prepared for use with eugenol to form the sedative cement.

Example III

| | Grams |
|---|---|
| Zinc oxide | 100 |
| Dicalcium phosphate | 100 |
| Mineral oil | .72 |
| Magnesium stearate | .72 |

Following the procedure of Example I the above may be prepared for use with eugenol to form the sedative cement.

The invention may be variously otherwise embodied within the scope of the appended claims.

What is claimed is:

1. A dental composition consisting essentially of zinc oxide, eugenol and dicalcium phosphate, the latter being present in at least about 2% of the weight of the zinc oxide.

2. A dental composition consisting essentially of zinc oxide, eugenol and dicalcium phosphate, the latter being present in from about 2–100% of the weight of the zinc oxide.

3. A constituent of a dental sedative cement consisting essentially of a substantially dry zinc oxide and dicalcium phosphate, the latter being present in an amount equal to about 2% by weight of the zinc oxide.

4. A constituent of a dental sedative cement consisting essentially of a substantially dry zinc oxide and dicalcium phosphate, the latter being present in at least about 2% of the weight of the zinc oxide.

5. A constituent of a dental sedative cement consisting essentially of a substantially dry zinc oxide and dicalcium phosphate, the latter being present in from about 2–100% of the weight of the zinc oxide.

6. The process of preparing a dental composition which comprises incorporating dicalcium phosphate with zinc oxide, the dicalcium phosphate being present in an amount equal to from about 2 to 100% by weight of the zinc oxide, and adding thereto sufficient eugenol to form a putty-like paste.

References Cited in the file of this patent

UNITED STATES PATENTS

| 1,408,960 | Schiff | Mar. 7, 1922 |
| 2,516,438 | Wheeler | July 25, 1950 |

OTHER REFERENCES

Ser. No. 283,225, Schmidl (A.P.C.), published May 11, 1943.

Skinner: "The Science of Dental Materials," pub. 1954 by Saunders Co., Phila., Pa. (pages 137 and 148).

Mellor: "Comprehensive Treatise on Theoretical and Inorganic Chemistry" (1922), vol. 3 (pages 883–884).